United States Patent
Ishizu

(10) Patent No.: US 6,816,533 B2
(45) Date of Patent: Nov. 9, 2004

(54) LASER OSCILLATOR

(75) Inventor: Mitsuo Ishizu, Koganei (JP)

(73) Assignee: Communications Research Laboratory, Independent Administrative Institution, Koganei (JP)

(*) Notice: Subject to any disclaimer, the term of this patent is extended or adjusted under 35 U.S.C. 154(b) by 100 days.

(21) Appl. No.: 10/330,096

(22) Filed: Dec. 30, 2002

(65) Prior Publication Data

US 2003/0128732 A1 Jul. 10, 2003

(30) Foreign Application Priority Data

Dec. 28, 2001 (JP) ........................................ 2001-400096

(51) Int. Cl.[7] .............................................. H01S 3/08
(52) U.S. Cl. .............................. 372/92; 372/27; 372/10; 372/106; 372/981
(58) Field of Search ......................... 372/92, 106, 100, 372/98, 10, 69, 27

(56) References Cited

U.S. PATENT DOCUMENTS

| | | | | | |
|---|---|---|---|---|---|
| 3,924,201 | A | * | 12/1975 | Crow | 372/108 |
| 4,408,334 | A | * | 10/1983 | Lundstrom | 372/98 |
| 4,461,009 | A | * | 7/1984 | Lundstrom | 372/108 |
| 4,740,986 | A | * | 4/1988 | Reeder | 372/92 |
| 4,884,044 | A | * | 11/1989 | Heywood et al. | 359/245 |
| 5,199,042 | A | * | 3/1993 | Papetti et al. | 372/95 |
| 5,276,694 | A | * | 1/1994 | Wolf et al. | 372/20 |
| 5,483,342 | A | * | 1/1996 | Rockwell | 356/491 |
| 5,781,571 | A | * | 7/1998 | Nabors et al. | 372/21 |
| 5,796,770 | A | * | 8/1998 | Gregor et al. | 372/75 |
| 5,963,574 | A | * | 10/1999 | Gregor et al. | 372/75 |
| 2003/0128732 | A1 | * | 7/2003 | Isdhizu | 372/75 |

FOREIGN PATENT DOCUMENTS

| | | |
|---|---|---|
| JP | 5-206560 | 8/1993 |
| JP | 7-162065 | 6/1995 |
| JP | 2001-237477 | 8/2001 |

OTHER PUBLICATIONS

L. E. Holder, et al., IEEE Journal of Quantum Electronics, vol. 28, No. 4, pp. 986–991, "One Joule Per Q–Switched Pulse Diode–Pumped Laser", Apr. 1992.

J. J. Kasinski, et al., IEEE Journal of Quantum Electronics, vol. 28, No. 4, pp. 977–985, "One Joule Output From A Diode–Array–Pumped Nd: Yag Laser with Side–Pumped Ord Geometry", Apr. 1992.

A. Maitland, et al., Lectures in Physics, chap. 11, sec. 4, pp. 305–309, "Laser Physics", 1969.

M. K. Chun, et al., Applied Optics, vol. 15, No. 8, pp. 1942–1946, "Laser Resonator: An Electrooptically Q–Switched Porro Prism Device", Aug. 1976.

* cited by examiner

Primary Examiner—Leon Scott, Jr.
(74) Attorney, Agent, or Firm—Oblon, Spivak, McClelland, Maier & Neustadt, P.C.

(57) ABSTRACT

A laser oscillator comprises a laser medium, an optical excitation laser diode that irradiates the laser medium with light, a polarizer disposed on an optical path of the laser medium at a first end thereof, a first Porro prism disposed with the optical path coinciding with a point on a ridgeline thereof and with the ridgeline parallel or perpendicular to a plane of incidence of the polarizer, and a second Porro prism disposed on the optical path of the laser medium at a second end thereof with the optical path coinciding with a point on a ridgeline thereof. An angle formed by the two ridgelines of the first and second Porro prisms is a predetermined angle other than 0 degrees, 90 degrees, 60 degrees, 45 degrees and 36 degrees, 30 degrees.

18 Claims, 6 Drawing Sheets

LASER OSCILLATOR

BACKGROUND OF THE INVENTION

1. Field of the Invention

The present invention relates to a laser oscillator that performs optical excitation, and more particularly to a laser oscillator having an exciting light source such as an exciting semiconductor laser diode (LD) arranged at the side of the laser medium, in which when there is an non-uniform distribution of the excitation produced in the laser medium, uniformity of the distribution of the laser oscillator energy can be achieved in a plane perpendicular to the optical axis of the laser medium by using different optical paths for the light reciprocating in each direction in the laser medium.

2. Description of the Prior Art

Solid-state laser excitation light sources used in the prior art include flash lamps. Although flash lamps are able to uniformly excite laser rods, their low conversion efficiency is a drawback. This led to the appearance of diode-pumped solid-state lasers that use a semiconductor laser as the exciting light source, which resulted in a major improvement of the conversion efficiency, from electrical input to laser output. It also became possible to improve the efficiency by using a slab-shaped laser medium It is well known that in order to generate a laser beam in which the beam section has a uniform energy density, the laser medium should be uniformly excited. In the case of a diode-pumped solid-state laser, the pumping laser beam emitted from one side of the laser rod makes a non-uniform excitation distribution in the rod, so the lasing transverse mode is raised to a higher-order mode, or the beam divergence angle is increased due to the deviation of the beam section from the round.

To avoid this, taking into account the non-uniformity in the excitation distribution produced in the rod by diode-side-pumping, uniform optical excitation distribution has been attained using summation of the optical paths between the ends of the laser resonator. For example, Reference 1 (L. E. Holder, C. Kennedy, L. Long and G. Dub: "One joule per Q-switched pulsed diode-pumped laser," IEEE J. Quantum Electron. vol. 28, no. 4, pp. 986–991, 1992) used an LD excited laser having the rod laser 21 with the rectangular section shown in FIG. 10 to form a zigzag optical path. As another example, Reference 2 (J. J. Kasinksi, W. Hughes, D. DiBiase, P. Bournes and R. Burnham, "One joule output from a diode-array-pumped Nd:YAG laser with side-pumped rod geometry," IEEE J. Quantum Electron., vol. 28, no. 4, pp 977–985, 1992) describes the configuration shown in FIG. 11 having a cylindrical laser rod 22, in which an excitation distribution close to a fundamental transverse mode intensity distribution was obtained and higher-order transverse-mode oscillation was suppressed by using LD excitation directed towards the center axis from a number of sides. In FIGS. 10 and 11, 23 is an end mirror, 24 are exciting LD's and 25 is an output mirror.

Laser oscillators that use two opposing Porro prisms have already been reported. While there can be mis-alignment of oscillator components and skewing and the like, due to the high stability of the lasing mode these laser oscillators have been used for special applications. Such a laser is described in Reference 3 (A. Maitland and M. H. Dunn, Laser Physics (North-Holland Publishing Company Amsterdam-London 1969), Chap. 11, Sec. 4, pp. 305–309). Also, Reference 4 (M. K. Chun and E. A Teppo, "Laser resonator, an electrooptically Q-switched Porro prism device," Applied Optics, vol. 15, no. 8, pp. 1942–1946, 1976) describes a pulse laser that uses a laser oscillator having a pair of opposing Porro prisms and a Q-switch.

Since the laser oscillators described in References 3 and 4 use lamp excitation, the excitation distribution in the laser rod is highly uniform and there is no need to even out the distribution. Therefore, there is no need to form the ridgelines of the two Porro prisms at any special angle other than parallel, 45 degrees or 90 degrees. The aim in setting these angles is mechanical stability of the resonator or to set the Q-switch. With these angles, during each round trip in the resonator, the optical path is not rotated, or is rotated 90 degrees or 180 degrees around the optical axis of the resonator. This rotation has not been noticed or been ignored in considering the laser modes so far, as well as in respect to the aim of effecting uniformity of the non-uniform excitation distribution.

However, the following problems are known to arise in the case of a laser oscillator used for optical excitation having a configuration in which the exciting light source is a semiconductor laser or the like disposed at the side of the laser medium. When a laser rod is used having a rectangular cross section, as shown in FIG. 10, and the excitation is both sides, the laser beam is internally reflected in a zigzag path and uniformity of the excitation distribution is achieved with respect to the laser beam. However, uniformity of the excitation distribution perpendicular thereto is not effected, so beam parameters such as beam diameter differ in the vertical and horizontal directions of the lasing beam section, resulting in a flat elliptical beam that readily produces higher-order modes.

In the case of a configuration using a cylindrical laser rod, as shown in FIG. 11, a complex structure has to be used to mount the LD's around the laser rod. This complicates the process of assembling the LD's and rod, increases the weight and degrades the mechanical strength. In addition, piping to carry the cooling fluid used to cool the LD's and the laser rod has to be connected to the LD mounts without blocking the lasing beams, necessitating the use of complicated routing for the cooling pipes. This complicates maintenance and checking, increasing the risk of malfunction. When the LD's and laser rod are cooled by thermal conduction rather than cooling fluid, the thermal conduction path is long and complicated. Moreover, LD's are driven by a heavy electric current, and the wiring used to deliver the electric current is rendered complex by the need to connect up each LD on its mount.

An object of the present invention is to provide a laser oscillator that can produce a laser beam in which the beam section has a uniform energy density, even when the exciting light sources are disposed at one side of the laser medium.

SUMMARY OF THE INVENTION

To attain the above object, the present invention provides a laser oscillator comprising an optical path combining first Porro prism and second Porro prism, a laser medium on the optical path, an optical excitation laser diode that irradiates the laser medium with light, a polarizer disposed on the optical path, a first Porro prism disposed with the optical path coinciding with a point on a ridgeline thereof and with the ridgeline parallel or perpendicular to a plane of incidence of the polarizer, a second Porro prism disposed on the optical path at a second end thereof with the optical path coinciding with a point on a ridgeline thereof, an angle formed by the two ridgelines of the first and second Porro prisms being a predetermined angle other than zero degrees or 90 degrees.

The present invention can include an oscillator having a Q-switch disposed on the optical path. For example, the Q-switch is disposed between the second end of the laser medium and the second Porro prism, or an oscillator with a Q-switch disposed between the polarizer and the first Porro prism.

The laser diode used can be one disposed to irradiate the laser medium with light from a side of the optical path.

The oscillator can include one having a control circuit for controlling duration of optical excitation and duration of lasing oscillation.

A prism that maintains the plane of polarization may be used in place of the first Porro prism and the second Porro prism.

As described above, by using two Porro prisms arranged so that the ridgelines of the prisms are crossed at an inclined angle, each time the laser beam is reciprocated in the laser rod, it is moved on a circle concentric with the optical axis, thereby achieving uniformity of excitation distribution relative to the laser beam.

Further features of the invention, its nature and various advantages will be more apparent from the accompanying drawings and following detailed description of the invention.

DESCRIPTION OF THE PREFERRED EMBODIMENT

Figure 1:
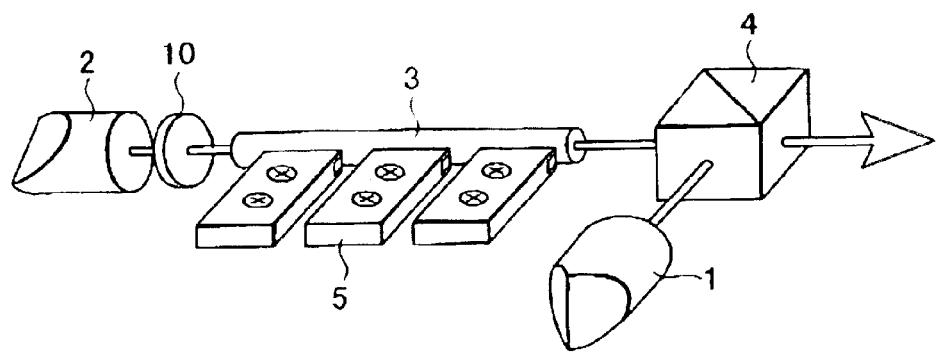
FIG. 1 is a schematic drawing of a laser oscillator according to a first embodiment of the present invention.

FIG. 1 shows a first embodiment of the laser oscillator according to the present invention. With reference to FIG. 1, an array 5 of a plurality of LD's is disposed at the side of a cylindrical laser rod 3. Light from the LD array 5 directly excites the laser rod 3 from one side thereof. A polarizer 4 is positioned at one end of the laser rod 3 on the optical path thereof, and a Porro prism 1 is arranged so that the optical path coincides with a point on the ridgeline of the prism, and the ridgeline is parallel or perpendicular to a plane of incidence of the polarizer 4.

A second Porro prism 2 is located on the optical path at the other end of the laser rod 3, with the optical axis coinciding with a point on the ridgeline thereof. The two Porro prisms 1 and 2 are set so that the ridgelines of the prisms cross at an inclined angle, forming a laser resonator. The relative angles of ridgelines of the Porro prism 1 and Porro prism 2 are adjusted to maximize the uniformity of the rod excitation distribution and prevent the generation of high-order angular modes. Light transmitted from the laser rod 3 towards the polarizer 4 is extracted as laser output.

One of the Porro prisms 1 or 2 may be made of the laser medium. Being disposed by a plurality of LD close to this prism, laser oscillation is possible without the laser rod in this configuration.

Each time the laser beam is reflected by a Porro prism, the image thereof is inverted in a direction perpendicular to the ridgeline of the Porro prism. Each time the beam is reflected back and forth in the resonator constituted by the two Porro prisms 1 and 2, the image is rotated through an angle that is twice the ridgeline angle formed by the Porro prism ridgelines. Due to this image rotation, each time the light beam passes through a point on the laser rod section, the beam is moved on a circle concentric with the optical axis; by using a suitable ridgeline angle, the beam does not pass through the same spot again. This symmetrizes the laser beam excitation distribution relative to the optical axis of the laser rod. As the excitation is horizontal, radial non-uniformity of the excitation distribution is equalized, so that, in terms of the laser rod section, an excitation distribution is obtained that is equivalently dose to even. This configuration makes it possible to realize a continuous-wave (CW) excitation solid-state laser or quasi-continuous-wave (QCW) excitation pulse laser.

Also, in accordance with this configuration, each time the laser beam is reflected back and forth in the resonator the beam is rotated to an angle that does not superimpose on the angle of rotational symmetry of primary and higher-order angular directions of the fundamental lasing mode, so that the distribution of a beam making a return pass in the resonator does not coincide with the original distribution, preventing high-order angular mode oscillation and enabling the achievement of zero-order fundamental mode lasing.

Moreover, inserting lens 10 into the resonator makes it possible to select zero-order radial oscillation, enabling $TEM_{00}$ oscillation mode to be obtained, or to render the laser intensity distribution of the beam section to be flat.

Also, a laser beam entering a Porro prism on the laser rod side that has been linearly polarized by two total reflections in the Porro prisms and image rotation, is returned as an elliptically polarized beam tilted relative to the principal axis. From this light, the polarizer returns the original polarization component to the resonator, maintaining the oscillation. In this case, the optimum ridgeline angle is one that enables suppression of higher-order modes and the obtaining of optimum output coupling at the polarizer. The relative ridgeline angle would be a predetermined angle other than 0 degree, 90 degrees, 60 degrees, 45 degrees and 36 degrees, 30 degrees. In the case of a Nd:YAG laser using Porro prisms of fused quartz or BK7 glass, the optimal predetermined angle would be within the range 90±30 degrees or 0±30 degrees.

In the case of a resonator laser having two Porro prisms with orthogonal ridgelines, each time the laser beam is reflected back and forth, the ridgeline image always coincides with a Porro prism ridgeline, making it easy for dark and bright cross-shaped stripes to enter the mode pattern. In the case of the laser oscillator of this invention, this does not happen, since the ridgeline image does not coincide with a Porro prism ridgeline.

With the ridgeline of the Porro prism 1 being perpendicular to the plane of incidence of the polarizer 4, a laser beam reflected back by the Porro prism 1 does not undergo any change in its polarization. Accordingly, all of the light from the Porro prism 1 falling incident on the polarizer 4 is transmitted towards the Porro prism 2. With respect to light that passes through the laser rod 3 and is reflected back by the Porro prism 2 to again fall incident on the polarizer 4, due to the inclination of the ridgeline of the Porro prism 2, the light undergoes a change of polarization, becoming elliptically polarized light. Thus, the horizontally polarized component is output via the polarizer 4 and is extracted outside the resonator as an output. It is desirable to adjust the ridgeline angle of Porro prism 2 to obtain the optimum amount of output coupling and image rotation.

Figure 2:
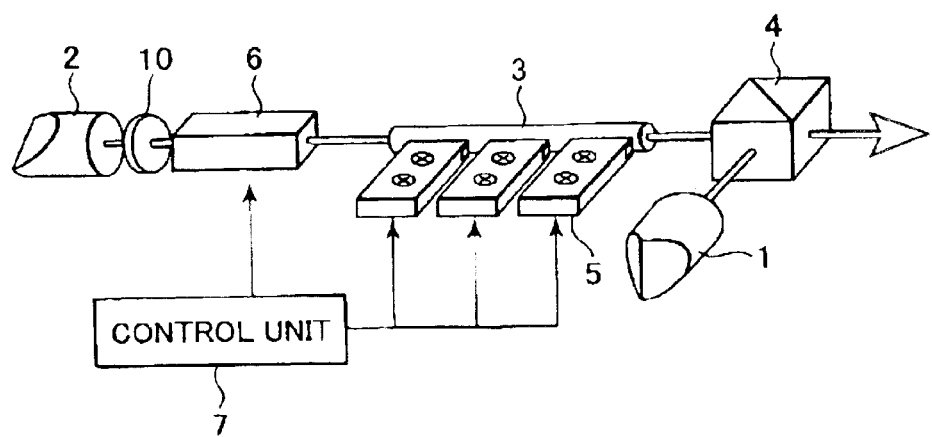
FIG. 2 is a schematic drawing of a laser oscillator according to a second embodiment of the present invention.

Next, FIG. 2 shows an example of a pulse laser using a Q-switch, comprising a second embodiment of the laser oscillator of the present invention. FIG. 2 shows a laser having a resonator in which a Q-switch 6 in the form of a Pockel's cell is disposed between a Porro prism 2 and a laser rod 3. In this laser, the Q-switch 6 is closed during the excitation by the LDs, suppressing oscillation, and is opened when after the enough excitation is build up, suddenly initiating oscillation and enabling short pulses to be obtained. A control unit 7 controls the initiation when the optical excitation by the LD array 5 starts, its duration, and the timing and duration of laser oscillation using the Q-switch 6.

The Q-switch 6 may be located anywhere in the oscillator. It can, for example, be located between the laser rod 3 and the polarizer 4. In the case of this laser, using the Porro prisms 1 and 2 to rotate the image enables the optical path to be set at various positions within the rod, providing the same effect as that obtained by uniform excitation around the whole circumference, making it possible to obtain a good-quality transverse mode. In the configuration of FIG. 2, no voltage is applied to the Q-switch during excitation; after excitation, a substantially ¼-wavelength voltage is applied.

To prevent oscillation starting during the excitation, the ridgeline of the Porro prism 2 should be set at an angle that enables a high amount of output coupling to be obtained, and a uniform excitation distribution. If the ridgeline of the Porro prism 2 is around 45 degrees, during excitation light is subjected to two Fresnel reflections inside the Porro prism 2, changing it to an elliptical beam whose major axis is perpendicular to the direction of polarization of the beam incident on the Porro prism 2, leading to too low reflectivity at the polarizer 4 to start the laser oscillation After a voltage has been applied to the Pockel's cell, the laser beam going from the Q-switch to the Porro prism 2 is circularly polarized light that remains substantially circularly polarized even after being reflected by the Porro prism 2. Thus, the light that passes through the rod towards the polarizer is elliptically polarized light that is close to the original linearly polarized light, whereby the laser oscillation starts.

Figure 4:
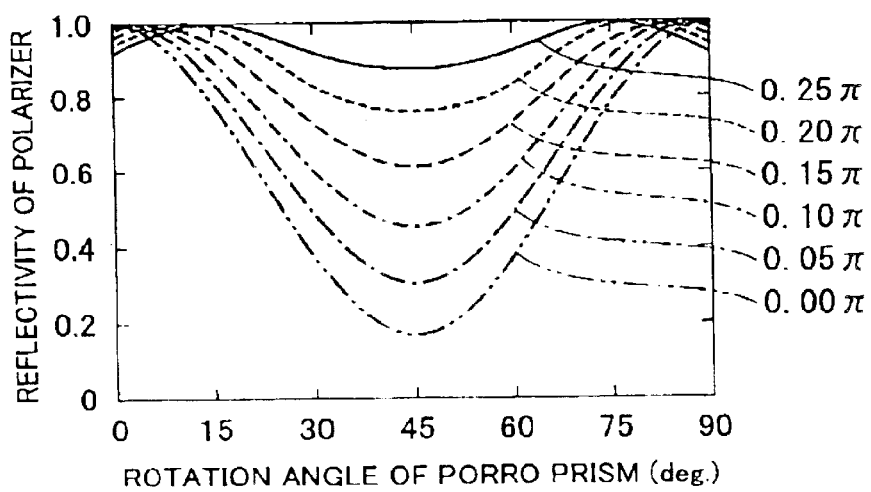
FIG. 4 shows the relationship between the angle of rotation of the Porro prisms and the reflectivity of the polarizer.
Figure 5:
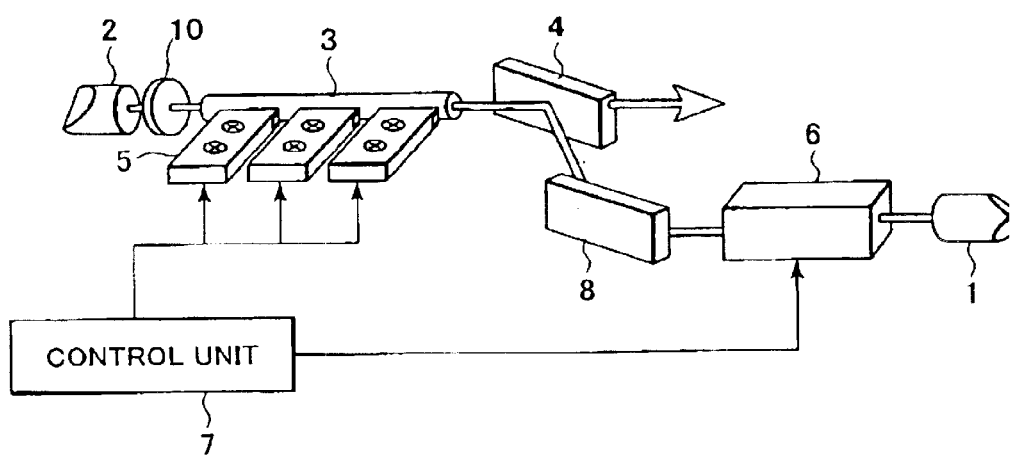
FIG. 5 is a schematic drawing of a laser oscillator according to a third embodiment of the present invention.

FIG. 4 shows the relationship between the angle of Porro prism rotation and polarizer reflectivity, in the case of a Nd-YAG laser oscillating at a wavelength of 1064-nm and fused silica Porro prisms The graph shows reflectivity (=1—output coupling level) at each of the following Q-switch phase differences, starting from the bottom curve: 0, 0.05π, 0.1π, 0.15π, 0.2π and 0.25π. As the angle of the Porro prism 2 was increased relative to the Porro prism 1 within the range 0 to 45 degrees, polarizer reflectivity decreased. Increasing the voltage applied to the Pockel's cell, thereby increasing the phase difference, reduced the rate of the reflectivity decrease. This shows that the reflectivity can be decreased when the voltage is reduced or not applied to the Pockel's cell. Applying an inverse voltage has the effect of inhibiting oscillation.

As described above, when no voltage is applied to the Pockel's cell the light traveling from the Porro prism 2 towards the polarizer is an almost linear but elliptically polarized light whose major axis is parallel to the incident plane of the polarizer 4, which damps the Q of the laser cavity too low to start the laser oscillation. When near the ¼-wavelength voltage is applied to the Q-switch, the light towards the polarizer turns to be an almost linear but elliptically polarized light whose major axis is nearly parallel to the incident plane of the polarizer, increasing the Q of the, laser cavity to be sufficient to start the laser oscillation. An optimal output coupling of the polarizer is obtained by reducing the reflectivity through the adjustments of the angle of the prism rotation or the voltage applied to the Pockel's cell(FIG. 4). The angle of the Porro prism 2, relative to the Porro prism 1 would be a predetermined angle other than 0 degrees, 90 degrees, 60 degrees, 45 degrees and 36 degrees, 30 degrees. In the case of a Nd:YAG laser using Porro prisms of fused quartz or BK7 glass, the optimal predetermined angle would be within the range 45±30 degrees.

Figure 3:
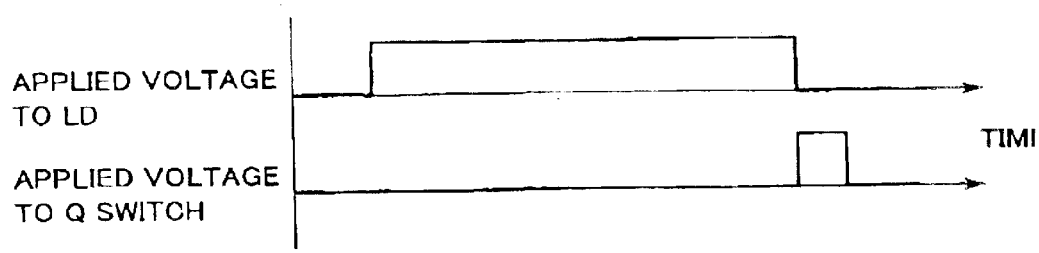
FIG. 3 shows the timing of the operation of the laser oscillator of the second embodiment.

With respect to FIG. 3, the initiation trigger of laser oscillation by applying a voltage to the Q-switch enough after a drive current is applied to the LD's to establish sufficient excitation in the laser medium. In the case of a continuously exciting Q-switched laser, the voltage can be applied to the Q-switch at set intervals that are just long enough for the oscillation to finish. The control unit 7 controls the voltage applied to the Q-switch and its timing and duration, and the drive current applied to the LD array 5 and its timing and duration.

The same Q-switch pulse laser operation can be achieved using an acousto-optic (AO) Q-switch instead of a Pockel's cell Q-switch, in which case the angle of the ridgeline of Porro prism 1 will be parallel or perpendicular to the plane of incidence of the polarizer. The relative ridgeline angle would be a predetermined angle other than 0 degrees, 90 degrees, 60 degrees, 45 degrees and 36 degrees, 30 degrees. Unlike in the case of a Pockel's cell Q-switch, the optimal predetermined angle would be within the range 90±30 degrees or 0±30 degrees. The laser rod can be placed between the Porro prism 1 and the polarizer. A passive Q-switch crystal such as $CR^{+4}$:YAG or the like can be used instead of an AO Q-switch In the laser oscillator of the second embodiment shown in FIG. 2, the Pockel's cell Q-switch 6 is provided between the Porro prism 2 and the polarizer 4, but Q-switch oscillation can also be obtained with the Q-switch situated between the polarizer 4 and the Porro prism 1. FIG. 7 shows a laser oscillator according to a third embodiment, in which a voltage is applied to the Q-switch 6 to initiate the oscillation, after completion of excitation by the Li) array 5. In this case, the ridgeline of the Porro prism 1 is set at 45±20 degrees to the plane of incidence of the polarizer 4, to prevent oscillation starting during excitation. To ensure optimal output from the polarizer 4, the relative ridgeline angle of the Porro prisms would be an angle other than 0 degrees, 90 degrees, 60 degrees, 45 degrees and 36 degrees, 30 degrees. Mirror 8 can be the same as the polarizer 4, or it can be omitted if it is not necessary to reflect the light. The ridgeline angles of the Porro prisms 1 and 2 can be adjusted to adjust the image rotation to achieve a uniform excitation distribution.

Figure 9:
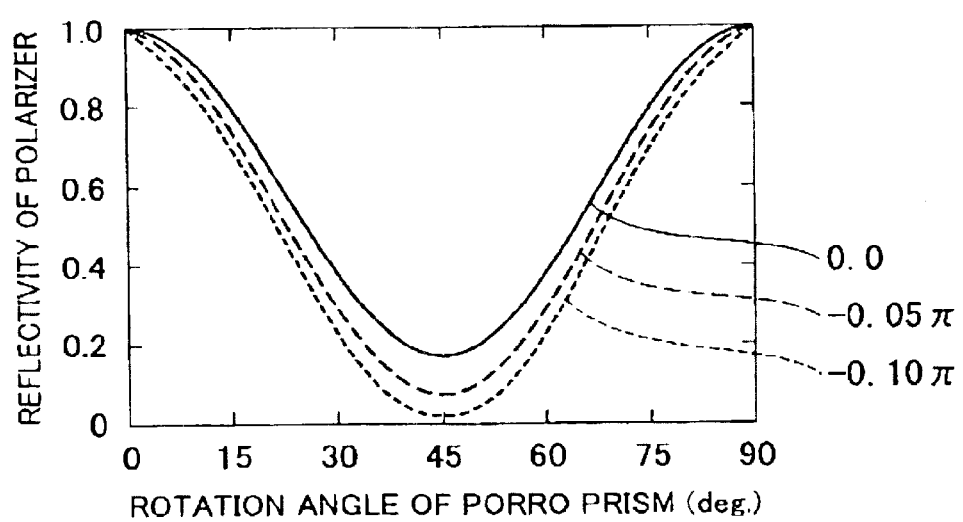
FIG. 9 shows the relationship between the angle of rotation of the Porro prisms and the reflectivity of the polarizer, when a reversed-polarity voltage is applied.
Figure 10:
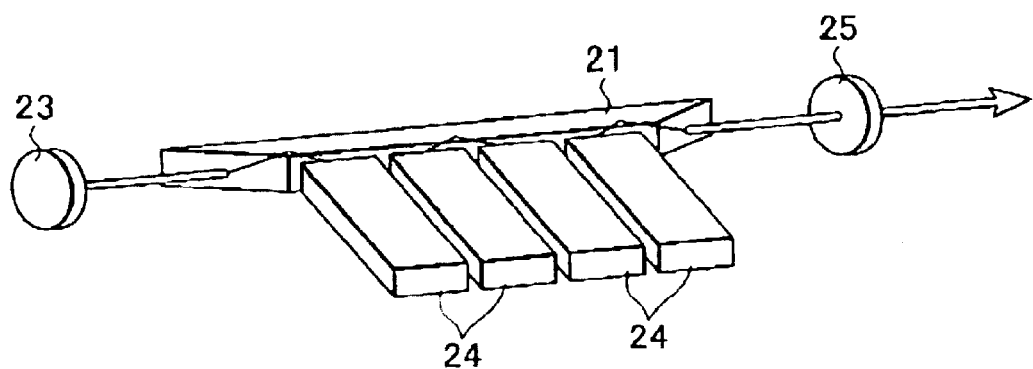
FIG. 10 is a schematic drawing showing a prior-art laser oscillator configured to produce a zigzag optical path.
Figure 11:
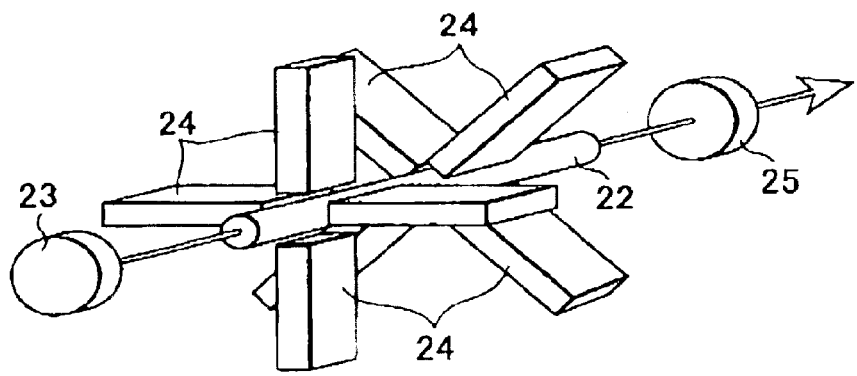
FIG. 11 is a schematic drawing showing a prior-art laser oscillator excited by LDs oriented towards the center as from a plurality of side directions.

When it is found that the initiation of oscillation during excitation is not prevented, such initiation can be prevented by applying a voltage to the Q-switch 6 having an inverse polarity to that used during oscillation. FIG. 9 shows the reflectivity of the polarizer when an inverse voltage is applied to the Q-switch 6, in the case of a Nd:YAG laser oscillating at a wavelength of 1064-nm and fused silica Porro prisms. The graph shows the reflectivity (=1—output coupling level) at Pockel's cell Q-switch phase differences of 0, $-0.05\pi$, and $-0.1\pi$. At a Porro prism ridgeline angle of 45 degrees relative to the plane of incidence of the polarizer and a phase difference of $-0.1\pi$, reflectivity was substantially zero, showing that oscillation could be suppressed. The solid line indicates a phase difference of zero, which is the same line as the FIG. 4 Q-switch phase difference of 0.0. A higher inverse voltage results in turning the polarizer reflectivity to increase again at around the rotation angle of the prism of 45 degrees, showing the decrease in the oscillation-inhibiting effect.

Figure 6:
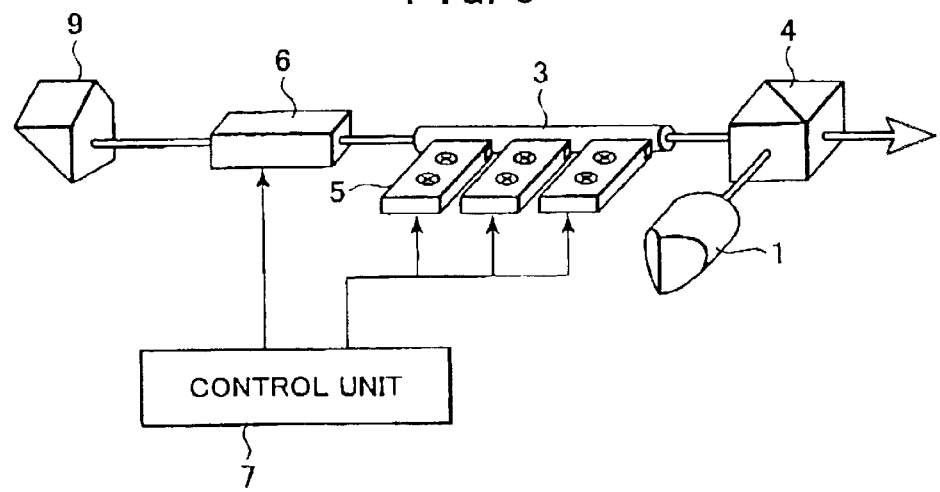
FIG. 6 is a schematic drawing of a laser oscillator according to a fourth embodiment of the present invention.
Figure 7A:
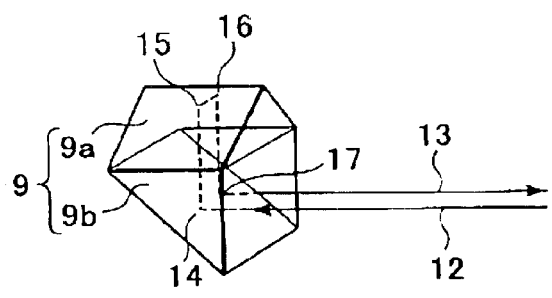
FIG. 7(a) is a schematic drawing showing a prism that maintains the plane of polarization constituted by two rectangular prisms, used in the laser oscillator of the fourth embodiment.
Figure 7B:
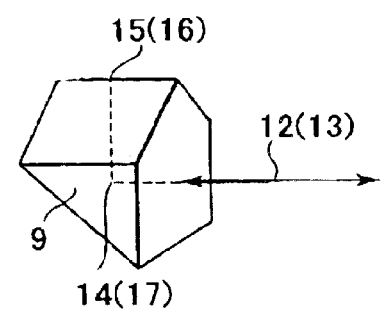
FIG. 7(b) is a schematic drawing showing the FIG. 7(a) prism that maintains the plane of polarization constituted by one rectangular prism.

FIG. 6 shows a laser oscillator according to a fourth embodiment of the invention, in which a prism 9 that maintains the plane of polarization and a wave plate 10 located along the optical path of the laser rod 3 are used in place of the Porro prism 2. As shown in FIG. 7(a), the prism 9 is formed by combining two right angle prisms 9a and 9b. To make it easier to understand, in FIG. 7(a) the incident beam 12 and outgoing beam 13 are shown as having separate locations. The outgoing beam has the same polarization state as the incident beam, but as in the case of the Porro prism configuration, the reflected image is rotated about the incident beam axis by an angle that is twice the angle of prism rotation. With a prism that maintains the plane of polarization, the setting of the Q-switch can be independently controlled, so that the laser beam image that was rotated according to the angle formed by the ridgelines is, in this case, rotated by the fast axis angle of the wave plate. The reference for the angle of prism rotation corresponding to the Porro prism ridgeline is a line connecting a first reflection point 14 and a second reflection point 15 in the prism. The angle that this line forms with the ridgeline of the Porro prism 1 is an angle on a circle concentric with the axis of the optical path in the laser rod 3 that is an angle other than 0 degrees, 90 degrees, 60 degrees, 45 degrees and 36 degrees, 30 degrees. While FIG. 7(a) shows the prism 9 composed of the two right angle prisms 9a and 9b, it can be constituted as a single prism, as in the case of the prism 9 shown in FIG. 7(b). In FIG. 7(a), reference numeral 16 denotes a third reflection point and 17 a fourth reflection point.

Figure 8:
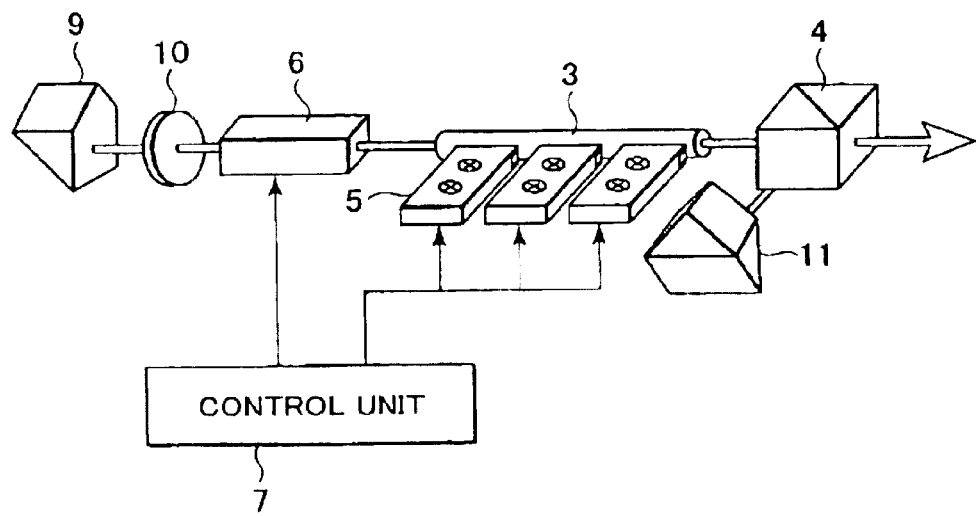
FIG. 8 is a schematic drawing showing a laser oscillator that is a variation of the fourth embodiment.

In the laser oscillator of FIG. 6, the output coupling level can be adjusted independently of the image rotation by rotating the wave plate 10 about the optical path of the resonator. The output coupling level can also be adjusted by adjusting the voltage applied to the Pockel's cell Q-switch 6. A prism 9 that maintains the plane of polarization and the wave plate 10 are used in place of the Porro prism 2. However, as shown in FIG. 8, a prism 11 that maintains the plane of polarization can also be used in place of the Porro prism 1. In the oscillator of FIG. 8, the prism 11 is located on the optical path of the plane of incidence of the polarizer 4. To form a plurality of optical paths in the laser rod 3 on a circle concentric with the optical axis and effect excitation having a uniform distribution, it is desirable to rotate the prisms 9 and 11 relative to each other to form an angle with a line connecting the first reflection point 13 and second reflecting point 14 of FIG. 7(a), that preferably is any angle but not 0 degrees, 90 degrees, 60 degrees, 45 degrees or 36 degrees, 30 degrees.

In the laser oscillator of the above first to fourth embodiments, the illustrated laser rod excitation section composed of a laser rod and a plurality of LD's is a single-stage configuration, but a multistage configuration can also be used to increase the laser output.

Also, although the LD's are shown as exciting the laser rod from one side, the invention is not limited to that, with side excitation from a number of directions around the periphery also being effective for achieving a fundamental transverse mode with a pair of Porro prisms. The function of the present invention can also be realized with a laser resonator in which the positions of the laser output beam and Porro prisms or polarizer that maintains the plane of polarization in the configuration of the first to fourth embodiments are changed.

A YAG, YLF or glass laser or other LD-excited solid-state laser generally has a simple structure but has the drawback that it is difficult to control the oscillation mode. However, using the configuration of this invention makes it possible to achieve a laser oscillator that exhibits good transverse mode oscillation, and adding a Q-switch inside the resonator enables a high-power laser oscillator to be realized that still has a simple structure. Specific examples of applications for the laser oscillator where there is a need for high output stability, oscillation stability and focussing performance include lasers used on space satellites, lasers used in research and development, lasers for medical applications and machining lasers.

The oscillator of this invention includes a laser medium, polarizer and a plurality of Porro prisms on the optical path of the laser oscillator that uses optical irradiation to excite the laser medium. The ridgelines of the Porro prisms are preset to form an angle other than 0 degrees, 90 degrees, 60 degrees, 45 degrees and 36 degrees, 30 degrees, enabling generation of a laser beam having a beam section with a uniform energy density The provision of Q-switch on the oscillator enables generation of a laser beam having a beam section with a uniform energy density.

Also, because the oscillator uses laser diodes as the exciting light source, a high conversion efficiency can be achieved. The oscillator also includes a control unit to control the duration of the excitation and lasing oscillation, thereby providing uniform laser pulses.

What is claim is:

1. A laser oscillator comprising: a laser medium; an optical path passes through the laser medium; an optical excitation laser diode that irradiates the laser medium with light; a polarizer disposed on an optical axis of the laser medium at a first end thereof, a first Porro prism disposed with the optical path coinciding with a point on a ridgeline thereof and with the ridgeline parallel or perpendicular to a plane of incidence of the polarizer; a second Porro prism disposed on the optical axis of the laser medium at a second end thereof with the optical path coinciding with a point on a ridgeline thereof; an angle formed by the two ridgelines of the first and second Porro prisms being a predetermined angle other than 0 degrees, 90 degrees, 60 degrees, 45 degrees and 36 degrees, 30 degrees.

2. A laser oscillator according to claim 1, wherein a Q-switch is disposed between the second end of the laser medium and the second Porro prism.

3. A laser oscillator according to claim 1, wherein a Q-switch is disposed between the polarizer and the first Porro prism.

4. A laser oscillator according to claim 1, wherein the laser diode is disposed to irradiate the laser medium from a side of the optical path.

5. A laser oscillator according to claim 1 that includes a control circuit for controlling duration of optical excitation and duration of lasing oscillation.

6. A laser oscillator according to claim 1, wherein an angle formed by the two ridgelines of the first and second Porro prisms is a predetermined angle of 90±30 degrees or 0±30 degrees but not 90 degrees, 60 degrees, 30 degrees, 0 degree.

7. A laser oscillator according to claim 1, wherein the first or the second Porro prism is made of a laser medium irradiated by laser diodes.

8. A laser oscillator comprising: a laser medium; an optical path passes through the laser medium; an optical excitation laser diode that irradiates the laser medium with light; a polarizer disposed on an optical axis of the laser medium at a first end thereof; a Porro prism disposed with the optical path coinciding with a point on a ridgeline thereof and with the ridgeline parallel or perpendicular to a plane of incidence of the polarizer; a wave plate and a prism that maintains the plane of polarization disposed in order on the optical axis of the laser medium at a second end thereof; wherein an angle formed between a line connecting first and second reflection points in the prism that maintains the plane of polarization and the ridgeline of the Porro prism is a predetermined angle other than 0 degrees, 90 degrees, 60 degrees, 45 degrees and 36 degrees, 30 degrees.

9. A laser oscillator according to claim 8, wherein a Q-switch is disposed between the second end of the laser medium and the wave plate.

10. A laser oscillator according to claim 8, wherein a Q-switch is disposed between the polarizer and the first Porro prism.

11. A laser oscillator according to claim 8, wherein the laser diode is disposed to irradiate the laser medium from a side of the optical path.

12. A laser oscillator according to claim 8 that includes a control circuit for controlling duration of optical excitation and duration of lasing oscillation.

13. A laser oscillator according to claim 8, wherein an angle formed between the Porro prism ridgeline and a line connecting first and second reflection points in the prism that maintains the plane of polarization is a predetermined angle other than 0 degrees, 90 degrees, 60 degrees, 45 degrees or 36 degrees, 30 degrees.

14. A laser oscillator comprising: a laser medium; an optical path passes through the laser medium; an optical excitation laser diode that irradiates the laser medium with light; a polarizer disposed on an optical axis of the laser medium at a first end thereof; a first prism that maintains the plane of polarization disposed on an optical path of a plane of incidence of the polarizer; a wave plate and a second prism that maintains the plane of polarization disposed in order on the optical axis of the laser medium at a second end thereof; wherein an angle formed between two lines connecting first and second reflection points in the first and second prisms that maintain the plane of polarization is an angle other than 0 degrees 90 degrees, 60 degrees, 45 degrees and 36 degrees, 30 degrees.

15. A laser oscillator according to claim 14, wherein a Q-switch is disposed between the second end of the laser medium and the wave plate.

16. A laser oscillator according to claim 14, wherein a Q-switch is disposed between the polarizer and the first prism that maintains the plane of polarization.

17. A laser oscillator according to claim 14, wherein the laser diode is disposed to irradiate the laser medium from a side of the optical path.

18. A laser oscillator according to claim 14 that includes a control circuit for controlling duration of optical excitation and duration of lasing oscillation.

* * * * *